United States Patent [19]

Nakajima

[11] Patent Number: 5,784,482
[45] Date of Patent: Jul. 21, 1998

[54] METHOD FOR REDUCING THE AMOUNT OF PROCESSING OF AN IRIS FILTER

[75] Inventor: Nobuyoshi Nakajima, Kanagawa-ken, Japan

[73] Assignee: Fuji Photo Film Co., Ltd., Kanagawa, Japan

[21] Appl. No.: 590,160

[22] Filed: Jan. 23, 1996

[30] Foreign Application Priority Data

Jan. 23, 1995 [JP] Japan ................... 7-042264
Apr. 10, 1995 [JP] Japan ................... 7-173594

[51] Int. Cl.$^6$ ...................................... G06K 9/00
[52] U.S. Cl. .......................... 382/132; 382/260
[58] Field of Search ...................... 382/132, 173, 382/205, 260, 298, 299; 364/724.01, 724.18; 128/922

[56] References Cited

U.S. PATENT DOCUMENTS

| | | | |
|---|---|---|---|
| 4,952,807 | 8/1990 | Adachi | 250/327.2 |
| 5,212,637 | 5/1993 | Saxena | 364/413.26 |
| 5,231,679 | 7/1993 | Matsuura et al. | 382/47 |
| 5,267,328 | 11/1993 | Gouge | 382/16 |
| 5,448,654 | 9/1995 | Katayama et al. | 382/298 |
| 5,481,623 | 1/1996 | Hara | 382/128 |
| 5,572,565 | 11/1996 | Abdel-Mottaleb | 378/37 |

OTHER PUBLICATIONS

"Detection of Tumor Patterns in DR Images (Iris Filter)" *Collected Papers of the Institute of Electronics and Communication Engineers of Japan*, D-II, vol. J75-D-II, No. 3, pp. 663-670, Mar. 1992.

*Primary Examiner*—Andrew W. Johns
*Attorney, Agent, or Firm*—Sughrue, Mion, Zinn, Macpeak & Seas, PLLC

[57] ABSTRACT

In an iris filter operation method, an image signal representing a radiation image of an object is obtained, and a tumor pattern is detected from the radiation image in accordance with the image signal. In an n'th operation processing of the iris filter, information representing the address of each of the picture elements, which are located along each of radial lines extending radially from a picture element of interest, is stored in an address storing means. A calculation is made to find a relative address of each of the picture elements of interest, which are set for an n+1'th processing and those that follow, with respect to the picture element of interest, which has been set in the n'th processing. The address calculation in each of the n+1'th processing and those that follow is carried out by adding the calculated relative address to the address of each of the picture elements, which address has been stored in the address storing means.

28 Claims, 7 Drawing Sheets

| $f_7$ | $f_6$ | $f_5$ | $f_4$ | $f_3$ |
|---|---|---|---|---|
| $f_8$ |  |  |  | $f_2$ |
| $f_9$ |  |  |  | $f_1$ |
| $f_{10}$ |  |  |  | $f_{16}$ |
| $f_{11}$ | $f_{12}$ | $f_{13}$ | $f_{14}$ | $f_{15}$ |

PICTURE ELEMENT j

METHOD FOR REDUCING THE AMOUNT OF PROCESSING OF AN IRIS FILTER

BACKGROUND OF THE INVENTION

1. Field of the Invention

This invention relates to an iris filter operation method for detecting primarily a tumor pattern from a radiation image.

2. Description of the Prior Art

Techniques for reading out a radiation image of an object and reproducing a visible radiation image have heretofore been carried out in various fields. With the techniques, a radiation image of an object, which has been recorded on a recording medium, such as a stimulable phosphor sheet or X-ray film, is read out, an image signal is thereby obtained, and the obtained image signal is subjected to appropriate image processing and then used for reproducing a visible image on a display device, or the like. In particular, recently, various digital radiography techniques, which utilize computers and are referred to as computed radiography, have been proposed and applied to clinical diagnoses, or the like.

The digital radiography has features drastically different from the conventional analog type of radiography in that an image signal can be analyzed quantitatively. Particularly for medical diagnoses of human bodies, techniques referred to as the computer aided diagnosis of medical images (CADM) have been proposed, which aim at more positively utilizing the features of the digital radiography.

The techniques for the computer aided diagnosis of medical images, or the like, assist in making diagnoses by reading patterns in an image at the sites of medical treatment. Specifically, in the past, medical specialists visually read patterns in radiation images having been reproduced on recording media, such as X-ray film, display devices, such as cathode ray tube (CRT) display devices, or the like, and made efforts in order to find out abnormal tumor patterns, which represented cancers, or the like, high-density small calcified patterns, and the like, in the early stages of the diseases. (The tumor patterns, small calcified patterns, and the like, will hereinbelow be referred to as the abnormal patterns.) However, in such cases, there is the risk that the abnormal patterns are left unnoticed or are misunderstood due to subjective judgments, depending on differences between the image understanding capabilities of persons, who see the radiation images.

Therefore, the techniques for the computer aided diagnosis of medical images aim at preventing the persons, who see the radiation images, from failing to notice the abnormal patterns and misunderstanding the abnormal patterns. For such purposes, with the techniques for computer aided diagnosis of medical images, a prospective abnormal pattern, which is considered as being an abnormal pattern, particularly a tumor pattern, is detected. Also, a marking is put on the detected portion in order to arouse an attention of the person, who sees the radiation image. Alternatively, characteristics of the detected prospective abnormal pattern are indicated quantitatively as materials, which are useful for objective judgments of the person, who sees the radiation image. (Reference should be made to "Detection of Tumor Patterns in DR Images (Iris Filter)," Collected Papers of The Institute of Electronics and Communication Engineers of Japan, D-II, Vol. J75-D-II, No. 3, pp. 663–670, March 1992.)

In the systems for the computer aided diagnosis of medical images, an iris filter is utilized as a means for detecting primarily a pattern of tumor, which is one of the characteristic forms of cancerous tissues. How the processing for detecting a tumor pattern is carried out with the iris filter will be described hereinbelow.

It has been known that, for example, in a radiation image recorded on a negative X-ray film, the density values of a tumor pattern are slightly smaller than the density values of the surrounding image areas. The density values of the tumor pattern are distributed such that the density value becomes smaller from the periphery of an approximately circular tumor pattern toward the center point of the tumor pattern. Therefore, in the tumor pattern, gradients of the density values can be found in local areas, and the gradient lines centralize in the directions heading toward the center point of the tumor pattern.

With the iris filter, the gradients of image signal values, which are represented by the density values, are calculated as gradient vectors, the degree of centralization of the gradient vectors is calculated, and a tumor pattern is detected in accordance with the calculated degree of centralization of the gradient vectors. Specifically, the gradient vector at an arbitrary picture element in a tumor pattern is directed to the vicinity of the center point of the tumor pattern. On the other hand, in an elongated pattern, such as a blood vessel pattern, gradient vectors do not centralize upon a specific point. Therefore, the distributions of the directions of the gradient vectors in local areas may be evaluated, and a region, in which the gradient vectors centralize upon a specific point, may be detected. The thus detected region may be taken as a prospective tumor pattern, which is considered as being a tumor pattern. The processing with the iris filter is based on such fundamental concept. Steps of algorithms of the iris filter will be described hereinbelow.

(Step 1) Calculation of gradient vectors

For each picture element j among all of the picture elements constituting a given image, the direction θ of the gradient vector of the image signal representing the image is calculated with Formula (1).

$$\theta = \tan^{-1} \frac{(f_3 + f_4 + f_5 + f_6 + f_7) - (f_{11} + f_{12} + f_{13} + f_{14} + f_{15})}{(f_1 + f_2 + f_3 + f_{15} + f_{16}) - (f_7 + f_8 + f_9 + f_{10} + f_{11})} \quad (1)$$

As illustrated in FIG. 2, $f_1$ through $f_{16}$ in Formula (1) represent the picture element values (i.e., the image signal values) corresponding to the picture elements located at the peripheral areas of a mask, which has a size of five picture elements (located along the column direction of the picture element array)×five picture elements (located along the row direction of the picture element array) and which has its center at the picture element j.

(Step 2) Calculation of the degree of centralization of gradient vectors

Thereafter, for each picture element among all of the picture elements constituting the given image, the picture element is taken as a picture element of interest, and the degree of centralization C of the gradient vectors with respect to the picture element of interest is calculated with Formula (2).

$$C = (1/N) \sum_{j=1}^{N} \cos \theta_j \quad (2)$$

As illustrated in FIG. 3, in Formula (2), N represents the number of the picture elements located in the region inside of a circle, which has its center at the picture element of interest and has a radius R, and θj represents the angle made between the straight line, which connects the picture element of interest and each picture element j located in the circle, and the gradient vector at the picture element j, which gradient vector has been calculated with Formula (1). Therefore, in cases where the directions of the gradient vectors of the respective picture elements j centralize upon the picture element of interest, the degree of centralization C represented by Formula (2) takes a large value.

The gradient vector of each picture element j, which is located in the vicinity of a tumor pattern, is directed approximately to the center portion of the tumor pattern regardless of the level of the contrast of the tumor pattern. Therefore, it can be regarded that the picture element of interest associated with the degree of centralization C, which takes a large value, is the picture element located at the center portion of the tumor pattern. On the other hand, in a linear pattern, such as a blood vessel pattern, the directions of the gradient vectors are biased to a certain direction, and therefore the value of the degree of centralization C is small. Accordingly, a tumor pattern can be detected by taking each of all picture elements, which constitute the image, as the picture element of interest, calculating the value of the degree of centralization C with respect to the picture element of interest, and rating whether the value of the degree of centralization C is or is not larger than a predetermined threshold value. Specifically, the iris filter has the features over an ordinary difference filter in that the iris filter is not apt to be adversely affected by blood vessel patterns, mammary gland patterns, or the like, and can efficiently detect tumor patterns.

In actual processing, such that the detection performance unaffected by the sizes and shapes of tumor patterns may be achieved, it is contrived to adaptively change the size and the shape of the filter. FIG. 4 shows an example of the filter. The filter is different from the filter shown in FIG. 3. With the filter of FIG. 4, the degree of centralization is rated only with the picture elements, which are located along radial lines extending radially from a picture element of interest in M kinds of directions at $2\pi/M$ degree intervals. (In FIG. 4, by way of example, 32 directions at 11.25 degree intervals are shown.)

In cases where the picture element of interest has the coordinates (k, l), the coordinates (x, y) of the picture element, which is located along an i'th radial line and is the n'th picture element as counted from the picture element of interest, are given by Formulas (3) and (4).

$$X = k + n \cos \{2\pi(i-1)/M\} \quad (3)$$

$$Y = l + n \sin \{2\pi(i-1)/M\} \quad (4)$$

wherein x represents the maximum integer, which does not exceed x, and y represents the maximum integer, which does not exceed Y.

Also, for each of the radial lines, the output value obtained for the picture elements ranging from the picture element of interest to a picture element, which is located along the radial line and at which the maximum degree of centralization is obtained, is taken as the degree of centralization with respect to the direction of the radial line. The mean value of the degrees of centralization, which have been obtained for all of the radial lines, is then calculated. The mean value of the degrees of centralization having thus been calculated is taken as the degree of centralization C of the gradient vector group with respect to the picture element of interest. Specifically, the degree of centralization $Ci(n)$, which is obtained for the picture elements ranging from the picture element of interest to the n'th picture element located along the i'th radial line, is calculated with Formula (5).

$$Ci(n) = \sum_{l=1}^{n} \{(\cos \theta_{il})/n\}, \, Rmin \leq n \leq Rmax \quad (5)$$

wherein Rmin and Rmax respectively represent the minimum value and the maximum value having been set for the radius of the tumor pattern, which is to be detected.

Specifically, a calculation is made to find the mean value of the index values $\cos \theta j$ having been calculated for all of the picture elements, which are located along each of the radial lines and fall within the range from the picture element of interest, that is located on each radial line, to a picture element, that is located at a length of distance falling within the range from a length of distance corresponding to the minimum size of the tumor pattern to be detected to a length of distance corresponding to the maximum size of the tumor pattern to be detected. A plurality of the mean values are thereby obtained for each of the radial lines.

Thereafter, The degree of centralization C of the gradient vector group is calculated with Formulas (6) and (7).

$$Ci_{max} = \max_{Rmin \leq n \leq Rmax} Ci(n) \quad (6)$$

$$C = (1/32) \sum_{i=1}^{32} Ci_{max} \quad (7)$$

Formula (6) represents the maximum value of the degree of centralization $Ci(n)$ obtained for each of the radial lines with Formula (5). Therefore, the region from the picture element of interest to the picture element associated with the degree of centralization $Ci(n)$, which takes the maximum value, may be considered as being the region of the prospective tumor pattern. By the detection of such regions for all of the radial lines with Formula (6), it is possible to judge the shape of the peripheral edge of the region, which may be regarded as the prospective tumor pattern.

With Formula (6), the maximum values of the degrees of centralization within the aforesaid regions are calculated for all directions of the radial lines. Thereafter, with Formula (7), the mean value of the maximum values of the degrees of centralization within the aforesaid regions, which maximum values have been given by Formula (6) for all directions of the radial lines, is calculated. The calculated mean value is compared with a predetermined threshold value T. From the results of the comparison, a judgment is made as to whether there is or is not a probability that the region having its center at the picture element of interest will be the prospective abnormal pattern.

The region, in which the degree of centralization C of the gradient vector group with Formula (7) is rated, is similar to the iris of the human's eye, which expands or contracts in accordance with the brightness of the external field. The size and the shape of the region is changed adaptively in accordance with the distribution of the gradient vectors. Therefore, the filter used is referred to as the iris filter.

(Step 3) Rating of the shape and form of the prospective tumor pattern

In general, patterns of malignant tumors have the characteristics of the shapes and forms described below.

1) The side edges are irregular.
2) The shape is close to an ellipse.
3) The region inside of the pattern has a convex or concave density distribution.

Therefore, a judgment is made as to the shape and form by considering these characteristics such that patterns of normal tissues may be eliminated from the detected prospective pattern, and such that only the prospective tumor pattern, which is considered as being a tumor pattern, can be detected. The characteristic measures used in making the judgment include the spreadness, the elongation, the roughness of side edges, the circularity, and the degree of convexity or concavity (i.e., the entropy) of the density distribution in the region inside of the pattern. The characteristic measures may be compared with a predetermined threshold value, and a final judgment may be made as to whether the detected pattern is or is not a prospective tumor pattern.

By carrying out the steps described above, the iris filter can efficiently detect a tumor pattern.

The calculation of the aforesaid degree of centralization $Ci(n)$ may be carried out by using Formula (5') in lieu of Formula (5).

$$Ci(n) = \frac{1}{n - Rmin + 1} \sum_{i=Rmin}^{n} \cos\theta_{ji}, Rmin \leq n \leq Rmax \quad (5')$$

Specifically, a calculation is made to find the mean value of the index values $\cos \theta_j$ having been calculated for all of the picture elements, which are located along each of the radial lines and fall within the range from a picture element, that is located at a length of distance corresponding to the minimum size of the tumor pattern to be detected, the length of distance being taken from the picture element of interest located on each radial line, to a picture element, that is located at a length of distance falling within the range from the length of distance corresponding to the minimum size of the tumor pattern to be detected to a length of distance corresponding to the maximum size of the tumor pattern to be detected, the length of distance being taken from the picture element of interest located on each radial line. A plurality of the mean values are thereby obtained for each of the radial lines.

With the iris filter described above, it is necessary for the calculation of the aforesaid degree of centralization C for each picture element to be repeated for all of the picture elements constituting the image. Thus the iris filter described above has the practical drawbacks in that the amount of calculation becomes very large. Due to the very large amount of calculation, considerable time is required for the processing for detecting a tumor pattern. Therefore, the person, who sees the radiation image, cannot detect a tumor pattern immediately when it is to be detected.

SUMMARY OF THE INVENTION

The primary object of the present invention is to provide an improved iris filter operation method, with which the processing for detecting a tumor pattern is carried out quickly.

Another object of the present invention is to provide an iris filter operation method, with which the operation of an iris filter is carried out quickly as a whole with respect to a radiation image.

The present invention provides a first iris filter operation method, in which an image signal representing a radiation image of an object is obtained, the image signal being made up of a series of image signal components representing picture elements of the radiation image, and a tumor pattern is detected from the radiation image in accordance with the image signal, the method comprising the steps of:

[1] for each picture element among all of the picture elements of the radiation image, calculating a gradient vector of the image signal,

[2] setting a picture element of interest having an arbitrary address, the picture element of interest being among all of the picture elements of the radiation image,

[3] setting a plurality of radial lines on the radiation image, the radial lines extending radially from the picture element of interest and being adjacent to one another at predetermined angle intervals,

[4] calculating the address of each of the picture elements, which are located along each of the radial lines,

[5] calculating an index value $\cos \theta_j$ representing the degree of centralization of the gradient vector, which has been calculated for each picture element among all of the picture elements located along each of the radial lines and having the addresses calculated, upon the picture element of interest, the index value $\cos \theta_j$ being calculated from an angle $\theta_j$ between the gradient vector, which has been calculated for the picture element, and the radial line,

[6] calculating a mean value of the index values $\cos \theta_j$ having been calculated for all of the picture elements, which are located along each of the radial lines and fall within the range from the picture element of interest, that is located on each radial line, to a picture element, that is located at a length of distance falling within the range from a length of distance corresponding to the minimum size of the tumor pattern to be detected to a length of distance corresponding to the maximum size of the tumor pattern to be detected, a plurality of the mean values being thereby obtained for each of the radial lines,

[7] finding the maximum value of the mean values, which have been obtained for each of the radial lines, calculating a total sum of the maximum values, which have been obtained for all of the plurality of the radial lines, and calculating a value of the degree of centralization of the gradient vector group with respect to the picture element of interest from the total sum,

[8] comparing the value of the degree of centralization of the gradient vector group and a predetermined threshold value with each other,

[9] in cases where the value of the degree of centralization of the gradient vector group is not smaller than a predetermined threshold value, judging that a range having its center at the picture element of interest and extending from the picture element of interest to the picture elements, which are associated with the maximum values of the mean values having been obtained for all of the plurality of the radial lines, is the tumor pattern, and

[10] successively setting an address of a picture element of interest over all of the picture elements of the radiation image, repeating the processing of [3] to [9], the tumor pattern being thereby detected from the radiation image, wherein the improvement comprises the steps of:

a) in an n'th processing from [3] to [9], wherein n=1, 2, . . . , storing the information representing the address of each of the picture elements, which are located along each of the radial lines, in an address storing means, the address having been calculated in the processing of [4], b) calculating a relative address of each of the picture elements of interest, which are set for an n+1'th processing and those that follow in the processing of [10], with respect to the picture element of interest, which has been set in the n'th processing, and c) carrying out the address calculation of [4] in each of the n+1'th processing and those that follow by adding the calculated relative address to the address of each of the picture elements, which address has been stored in the address storing means.

Specifically, with the conventional iris filter processing, the processing from [3] to [9] is repeated with the picture element of interest being changed successively.

Therefore, in cases where an image consists of, for example, $10^6$ picture elements (i.e., 1,000 picture elements× 1,000 picture elements), the processing from [3] to [9] is carried out with respect to a certain picture element of interest among the $10^6$ picture elements in the first processing. Thereafter, the same processing as the processing from [3] to [9] is repeated the number of times equal to the number of all picture elements (in a strict sense, $10^6-1$ times which is equal to the number of all picture elements minus the picture element of interest in the first processing).

In the iris filter operation method in accordance with the present invention, as described above, in the n'th processing from [3] to [9], specifically in the n'th calculation processing with Formulas (3) through (7), preferably in the first processing, the address of each of the picture elements, which are located along each of the radial lines, is calculated with Formulas (3) and (4). The information representing the addresses of all of the picture elements, which are located along each of the radial lines, is stored in the address storing means. In the n+1'th processing and those that follow, preferably in the second processing and those that follow, instead of the address calculation being carried out with Formulas (3) and (4), the relative address of each of the picture elements of interest, which are set for the n+1'th processing and those that follow, with respect to the picture element of interest, which has been set in the n'th processing, is added to the address of each of the picture elements, which address has been stored in the address storing means. In this manner, the address of each of the picture elements, which are located on each of the radial lines, in the n+1'th processing and those that follow is calculated.

In this manner, instead of the complicated calculations with trigonometric functions of Formulas (3) and (4) being repeated, a very large number of the address calculations are carried out with the simple calculation processing, i.e. the additions or subtractions. Therefore, the operation of the iris filter can be carried out quickly.

The address calculations with Formulas (3) and (4) should preferably be carried out in the first processing. In all of the second processing and those that follow, the address calculations should preferably be carried out with the addition or subtraction processing. In such cases, the operation of the iris filter can be carried out more quickly.

As described above, the gradient vector of the image signal for each picture element is calculated with Formula (1) by utilizing the mask shown in FIG. 2, which comprises 5 picture elements×5 picture elements and has its center at each picture element. The mask comprising 5 picture elements×5 picture elements is a mere example, and the size of the mask need not necessarily be equal to 5 picture elements×5 picture elements. For example, the mask may have a size of 3 picture elements×3 picture elements, a size of 7 picture elements×7 picture elements, or a size other than these sizes.

The present invention also provides a second iris filter operation method, wherein the improvement comprises the steps of:

a) quantizing the directions of the gradient vectors, which have been calculated in the processing of [1], into predetermined M kinds of directions represented by 2 πm/M, wherein M represents an integral number of at least 3, and m represents an integral number of at least 0, with the proviso that m=0, 1, . . . , M−1, b) quantizing the directions of the plurality of the radial lines in the processing of [3] into N kinds of directions represented by 2 πj/N, wherein N represents an integral number of at least 3, and j represents an integral number of at least 0, with the proviso that j=0, 1, . . . , N−1, c) thereby quantizing the angles θj, each of which is made between the gradient vector, that has been calculated for the picture element, and the radial line in the processing of [5], d) calculating the index value cos θj corresponding to each of the quantized angles θj, a look-up table for converting the quantized angles θj into the index values cos θj being thereby prepared, and e) carrying out the calculation of the index value cos θj in the processing of [5] by obtaining the index value cos θj for each of the quantized angles θj from the look-up table.

Specifically, the directions θ of the gradient vectors, which have been calculated in the processing of [1], are of analog values, and therefore take continuous values. In the iris filter operation method in accordance with the present invention, the directions θ of the gradient vectors, which have been calculated in the processing of [1], are quantized into predetermined M kinds of directions represented by 2 πm/M. Also, the directions of the plurality of the radial lines in the processing of [3] are set at N kinds of directions represented by 2πj/N. As a result, the angles θj, each of which is made between the gradient vector, that has been calculated for each picture element, and each radial line in the processing of [5], can be quantized into the directions in a limited number represented by 2π(m/M−j/N).

Therefore, the index value cos θj corresponding to each of the quantized angles θj can be calculated, and a look-up table for converting the quantized angles θj into the index values cos θj can thereby be prepared. From the look-up table, the index value cos θj can be obtained easily for each of the quantized angles θj of the gradient vectors obtained in the processing of [5]. In this manner, the processing of the trigonometric function of Formula (5), which takes a comparatively long time, can be simplified, and the processing with the iris filter can be carried out quickly.

The number of the directions θ, which the gradient vectors take, and the number of the directions of the plurality of the radial lines may be set such that they may be equal to each other. Also, the directions θ, which the gradient vectors take, and the directions of the plurality of the radial lines may be set such that they may coincide with each other. In such cases, the angles θj, each of which is made between the gradient vector, that has been calculated for each picture element, and each radial line, can be quantized into the directions in a limited number represented by 2 π(m−j)/M. Therefore, the processing becomes simpler. The processing can be simplified also by setting the value of N to be integral multiples of the value of M or by setting the value of M to be integral multiples of the value of N.

The present invention further provides a third iris filter operation method, wherein the improvement comprises the steps of:

a) detecting an object image region in the radiation image with a technique for determining an object image region, and b) carrying out the processing from [1] to [10] only for the picture elements located within the detected object image region.

Specifically, no tumor pattern can be present in region other than the object image region in the radiation image. Therefore, the detection processing is not carried out for the region other than the object image region in the radiation image and is carried out only for the object image region.

As the technique for detecting an object image region, for example, the technique disclosed in U.S. Pat. No. 4,952,807 may be utilized. Specifically, the disclosed technique utilizes the feature of an X-ray image of, for example, the mamma of a human body in that the mamma image pattern is recorded in an approximately semicircular shape on a recording medium, and a background region is located on the side outward from the circular arc of the approximately semicircular shape. With the disclosed technique, a change in the image signal at the boundary between the object image region (in this case, the mamma image pattern) and the background region is detected. The position of the object image region in the X-ray image can thereby be automatically determined. In cases where the disclosed technique is utilized, the object image region can be detected from the image signal representing the radiation image.

Also, as a technique for more reliably determining the object image region, one of the techniques disclosed in, for example, U.S. Pat. No. 5,481,623 should preferably be utilized. With the disclosed techniques, the degrees of certainty, which indicate step-wise the levels of probability that an object image to be detected will be present in partial regions on the recording medium, are calculated. The degree of certainty is calculated for each of the partial regions on the recording medium, in which partial regions the object image is expected as being recorded. Thereafter, the position of the object image on the recording medium is determined synthetically on the basis of a plurality of the degrees of certainty, which have been calculated for the respective partial regions on the recording medium.

Alternatively, of the values of the image signal components of the image signal representing the entire image, an image signal value between the values of the image signal components corresponding to a region, in which no object image is located, and the values of the image signal components corresponding to the object image region may be set as a threshold value. The values of the image signal components representing all of the picture elements constituting the image and the threshold value may then be compared with each other, and the object image region may thereby be detected. As another alternative, a probability density function of the image signal may be created, and an image signal value corresponding to a region, which is considered as being an object image region in accordance with the pattern of the probability density function, may be set as a threshold value. Thereafter, the image signal values representing all of the picture elements of the radiation image and the threshold value may be compared with each other, and the object image region may thereby be detected.

The present invention still further provides a fourth iris filter operation method, wherein the improvement comprises obtaining the image signal by resampling the image signal components from an original image signal at a resampling density falling within the range of ⅛ to ½ along each of the row and column directions in the array of picture elements.

In the iris filter operation method in accordance with the present invention, two or more of the aforesaid first to fourth iris filter operation methods may be combined with each other.

Also, the iris filter operation methods in accordance with the present invention can be applied to the apparatus for computer aided diagnosis of medical images.

Specifically, in the apparatus for computer aided diagnosis of medical images, a marking may be put on the prospective tumor pattern having been detected quickly with one of the iris filter operation methods in accordance with the present invention. Alternatively, characteristics of the detected prospective tumor pattern may be quantitatively presented. As another alternative, the entire image may be displayed on a display device, such as a CRT display device, with a standard image size, and only the prospective tumor pattern may be displayed with an enlarged image size. In such cases, the iris filter operation methods in accordance with the present invention become more useful for the person, who sees the radiation image, to make a judgment.

In the aforesaid first, second, third, and fourth iris filter operation methods in accordance with the present invention, the processing of [6] may be modified in the manner described below. Specifically, a calculation may be made to find a mean value of the index values $\cos \theta j$ having been calculated for all of the picture elements, which are located along each of the radial lines and fall within the range from a picture element, that is located at a length of distance corresponding to the minimum size of the tumor pattern to be detected, the length of distance being taken from the picture element of interest located on each radial line, to a picture element, that is located at a length of distance falling within the range from the length of distance corresponding to the minimum size of the tumor pattern to be detected to a length of distance corresponding to the maximum size of the tumor pattern to be detected, the length of distance being taken from the picture element of interest located on each radial line, a plurality of the mean values being thereby obtained for each of the radial lines. In such cases, the same effects as those of the first, second, third, and fourth iris filter operation methods in accordance with the present invention can be obtained.

With the first iris filter operation method in accordance with the present invention, instead of the complicated calculations with trigonometric functions of Formulas (3) and (4) being repeated, a very large number of the address calculations, which are repeated for all of the picture elements, can be carried out with the simple calculation processing, i.e. the additions or subtractions. Therefore, the operation of the iris filter can be carried out quickly.

With the second iris filter operation method in accordance with the present invention, the directions $\theta$ of the gradient vectors, which are of analog values and therefore take continuous values, are quantized into predetermined M kinds of directions represented by $2\pi m/M$. Also, the directions of the plurality of the radial lines in the processing of [3] are set at N kinds of directions represented by $2\pi j/N$. As a result, the angles $\theta j$, each of which is made between the gradient vector, that has been calculated for each picture element, and each radial line in the processing of [5], can be quantized into the limited number of directions.

Therefore, the index value $\cos \theta j$ corresponding to each of the quantized angles $\theta j$ can be calculated, and a look-up table for converting the quantized angles $\theta j$ into the index values $\cos \theta j$ can thereby be prepared. From the look-up table, the index value $\cos \theta j$ can be obtained easily for each of the quantized angles $\theta j$ of the gradient vectors obtained in the processing of [5]. In this manner, the processing of the trigonometric function of Formula (5) or (5'), which takes a comparatively long time, can be simplified, and the processing with the iris filter can be carried out quickly.

With the third iris filter operation method in accordance with the present invention, the operation of the iris filter is carried out only for the picture elements, which are located in the object image region in the radiation image. Specifically, as for the region, in which no object image can be present and therefore no tumor pattern can be present, the detection processing with the iris filter operation method is not carried out. Therefore, the operation of the iris filter can be omitted for the region, in which no object image can be present. Accordingly, as a whole, the operation of the iris filter can be carried out quickly.

With the fourth iris filter operation method in accordance with the present invention, the image signal, which is subjected to the operation of the iris filter, is obtained by resampling the image signal components from an original image signal at a resampling density falling within the range of ⅛ to ½ along each of the row and column directions in the array of picture elements. Therefore, the number of the image signal components, which are subjected to the operation of the iris filter, becomes equal to a number falling within the range of 1/64 to ¼ of the number of the image signal components of the original image signal. Accordingly, the operation of the iris filter can be carried out quickly with respect to the entire area of the radiation image.

DESCRIPTION OF THE PREFERRED EMBODIMENTS

The present invention will hereinbelow be described in further detail with reference to the accompanying drawings.

Figure 1:
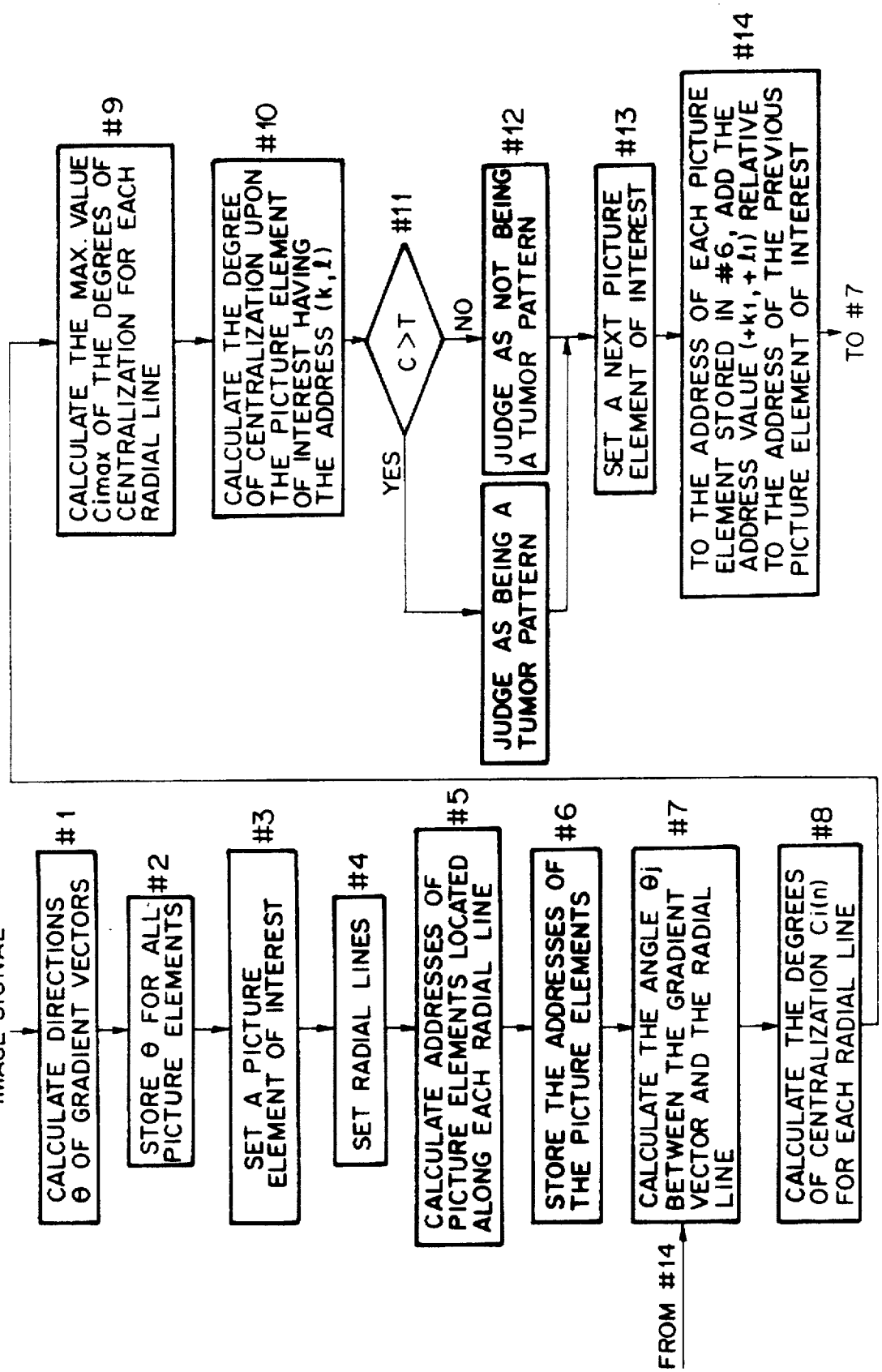
FIG. 1 is a flow chart showing processing steps in an embodiment of the first iris filter operation method in accordance with the present invention.

FIG. 1 is a flow chart showing processing steps in an embodiment of the first iris filter operation method in accordance with the present invention.

Figures 2, 3:
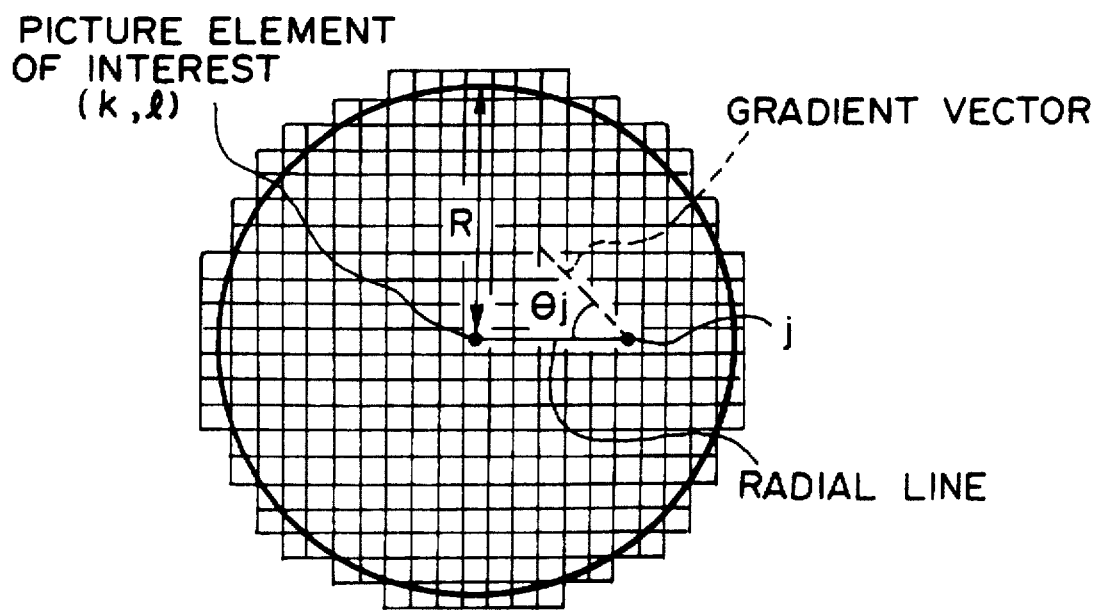
FIG. 2 is an explanatory view showing a mask for calculating gradient vectors.
FIG. 3 is an explanatory view showing the concept behind the degree of centralization of a gradient vector with respect to a picture element of interest.

With the iris filter operation method shown in FIG. 1, in a first step 1 (#1), an image signal D, which represents a radiation image of an object, is received from an image read-out apparatus, or the like. Also, as illustrated in FIG. 2, directions θ of gradient vectors are calculated for all of picture elements constituting the radiation image by using Formula (1) and in accordance with the image density values represented by the image signal D. In a step 2 (#2), the information representing the directions θ of the gradient vectors, which have been calculated for all of the picture elements constituting the radiation image, is stored in a predetermined storage means (not shown).

Figure 4:
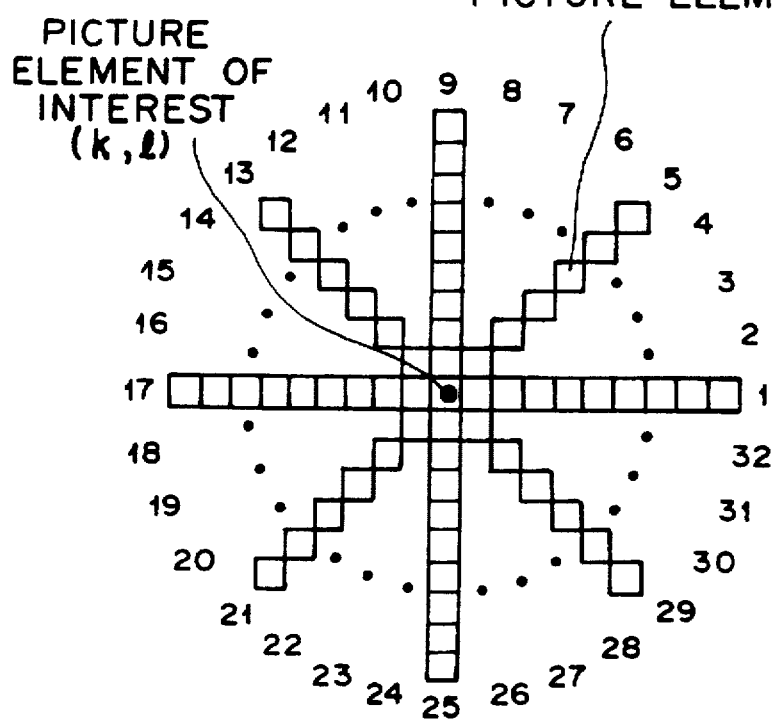
FIG. 4 is an explanatory view showing a plurality of radial lines extending radially from a picture element of interest.

Thereafter, in a step 3 (#3), as illustrated in FIG. 3, a picture element, which is located at an arbitrary address (k, l) and is among all of the picture elements constituting the radiation image, is set as a picture element of interest. Also, in a step 4 (#4), as illustrated in FIG. 4, 32 radial lines are set on the radiation image. The radial lines extend radially from the picture element of interest and are adjacent to one another at 11.25 degree intervals.

In a step 5 (#5), the address (x, y) of each of the picture elements, which are located along each of the radial lines, is calculated with Formulas (8) and (9) shown below. In Formulas (8) and (9), i represents the number of each radial line in FIG. 4 ($1 \leq i \leq 32$;) an integral number).

$$X = k + n \cos \{11.25 (i-1)\} \quad (8)$$

$$Y = l + n \sin \{11.25 (i-1)\} \quad (9)$$

In a step 6 (#6), as for all of the picture elements, the addresses of which have been calculated, the information representing the address of each of the picture elements is stored in a predetermined storage means (not shown).

In a step 7 (#7), for each of the picture elements, the addresses of which have been calculated in the step 5 (#5), the direction θ of the gradient vector, which has been stored in the step 2 (#2), is read from the storage means. Also, an angle θj between the gradient vector, which has been calculated for each picture element, and each radial line, is calculated with Formula (10).

$$\theta j = 180° + \{11.25° (i-1) - \theta\} \quad (10)$$

Thereafter, in a step 8 (#8), a calculation is made to find an index value cos θj representing the degree of centralization of the gradient vector, which has been calculated for each picture element among all of the picture elements located along each of the radial lines, upon the picture element of interest. The index value cos θj is calculated from the angle θj between the gradient vector, which has been calculated for each picture element, and each radial line. Also, in the step 8 (#8), a calculation is made to find a mean value Ci(n) of the index values cos θj having been calculated for all of the picture elements, which are located along each of the radial lines and fall within the range from the picture element of interest, that is located on the radial line, to a picture element, that is located at a length of distance falling within the range from a length of distance (an Rmin'th picture element) corresponding to the minimum size of the tumor pattern to be detected to a length of distance (an Rmax'th picture element) corresponding to the maximum size of the tumor pattern to be detected. The calculation is carried out with Formula (5). In this manner, a plurality of the mean values are obtained for each of the radial lines. In Formula (5), cos θil represents the rating value for the degree of centralization at the picture element, which is located on the i'th radial line shown in FIG. 4 and corresponds to l'th position, as counted from the picture element of interest, on the i'th radial line. Thus cos θil represents the index value cos θj at the l'th picture element on the i'th radial line. Also, Ci(n) represents the degree of centralization, which is obtained for the picture elements ranging from the picture element of interest to the n'th picture element on the i'th radial line.

In lieu of Formula (5), Formula (5') may be used.

In a step 9 (#9), a maximum value Cimax of the values of Ci(n), which are obtained when the value of n is changed to values falling within the range from Rmin to Rmax, is calculated with Formula (6). By the calculation of the maximum value Cimax, the picture element, which is associated with the maximum degree of centralization, on the i'th radial line can be specified.

In the manner described above, the maximum value Cimax is obtained for each of the radial lines. Thereafter, in a step 10 (#10), the maximum values Cimax, which have been obtained for all of the plurality of the radial lines, are added and averaged with Formula (11) shown below. The degree of centralization C with respect to the picture element of interest having the address (k, l) is thus calculated.

$$C = \frac{1}{32} \sum_{i=1}^{32} Ci \max \qquad (11)$$

In a step 11 (#11), the calculated degree of centralization C and a predetermined threshold value T are compared with each other. Thereafter, in a step 12 (#12), in cases where C>T, it is judged that the picture element of interest corresponds to the center portion of a tumor pattern. In cases where C≦T, it is judged that the picture element of interest does not correspond to the center portion of a tumor pattern.

Specifically, the threshold value T is the value predetermined experimentally for use in making a judgment as to whether a pattern is or is not a tumor pattern.

In a step 13 (#13), a next picture element of interest is set. Thus the picture element of interest is changed successively over all of the picture elements constituting the radiation image, and the processing from #4 to #12 is repeated for the respective picture elements of interest. If the address of the next picture element of interest is $(k+k_1, l+l_1)$, it can be said that the next picture element of interest is the one translated in parallel by $+k_1$ along the x direction and by $+l_1$ along the y direction from the picture element of interest having the address (k, l), which was set in the first processing.

Therefore, in a step 14 (#14), the relative address values $(+k_1, +l_1)$ are added to the address of each picture element, which was calculated in the previous processing and stored in the storage means in the step 6 (#6). In this manner, the address (x, y) of each of the picture elements, which are located along each of the radial lines extending radially from the new picture element of interest, is calculated. The processing procedure is then returned to the step 7 (#7), and the processing is repeated.

In the manner described above, with this embodiment of the first iris filter operation method in accordance with the present invention, instead of the complicated calculations with trigonometric functions of Formulas (8) and (9) being repeated, a very large number of the address calculations can be carried out with the simple calculation processing, i.e. the additions or subtractions. Therefore, as a whole, the operation of the iris filter can be carried out quickly.

Figure 5:
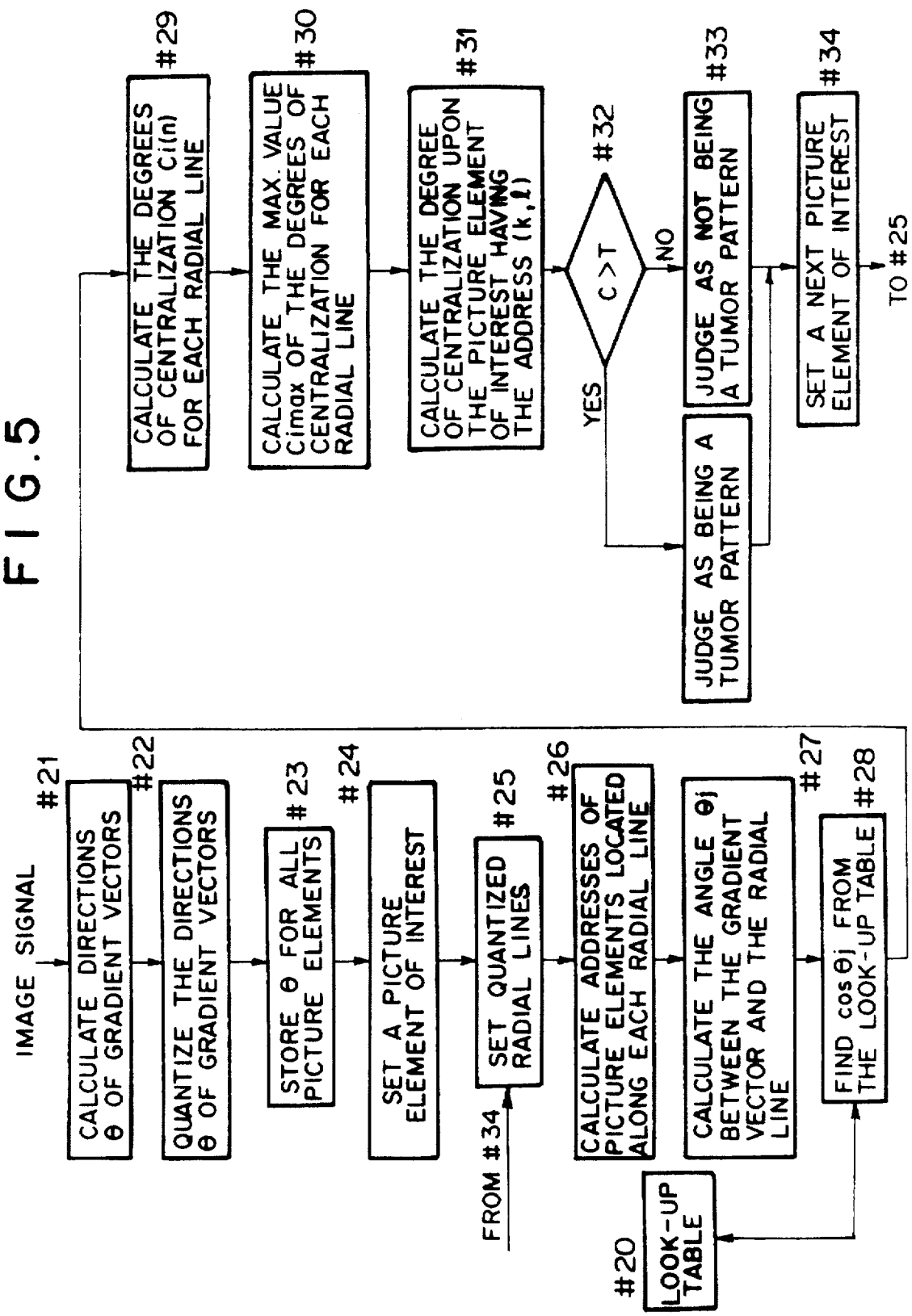
FIG. 5 is a flow chart showing processing steps in an embodiment of the second iris filter operation method in accordance with the present invention.

FIG. 5 is a flow chart showing processing steps in an embodiment of the second iris filter operation method in accordance with the present invention.

Figure 6:
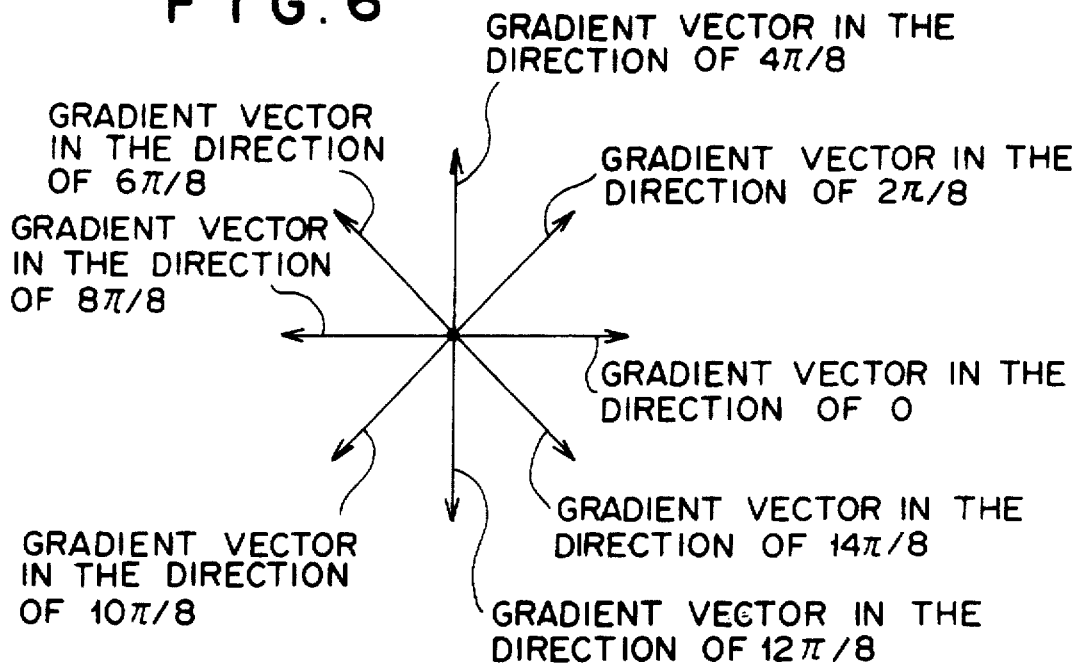
FIG. 6 is an explanatory view showing eight kinds of directions represented by 2 πm/8, into which the directions of gradient vectors are quantized.

With the iris filter operation method shown in FIG. 5, in a first step 21 (#21), an image signal D, which represents a radiation image of an object, is received from an image read-out apparatus, or the like. Also, as illustrated in FIG. 2, directions θ of gradient vectors are calculated for all of picture elements constituting the radiation image by using Formula (1) and in accordance with the image density values represented by the image signal D. In this embodiment of the operation method, in a step 22 (#22), as illustrated in FIG. 6, the directions θ of the gradient vectors are quantized into predetermined eight kinds of directions represented by 2 πm/8, wherein m represents an integral number of at least 0, with the proviso that m=0, 1, ..., 7. Also, in a step 23 (#23), the information representing the quantized directions θ of the gradient vectors, which have been calculated for all of the picture elements constituting the radiation image, is stored in a predetermined storage means (not shown).

Figure 7:
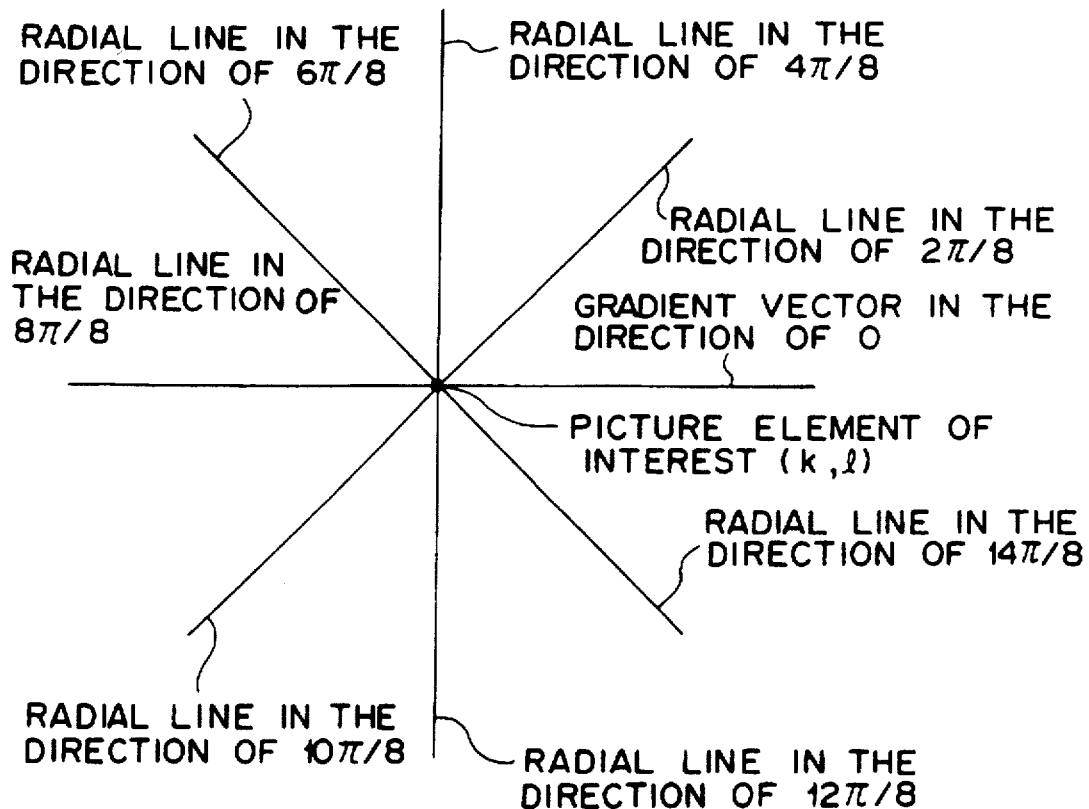
FIG. 7 is an explanatory view showing eight kinds of directions represented by 2 πj/N, into which the directions of a plurality of radial lines extending radially from a picture element of interest are quantized.

Thereafter, in a step 24 (#24), a picture element, which is located at an arbitrary address (k, l) and is among all of the picture elements constituting the radiation image, is set as a picture element of interest. Also, in a step 25 (#25), eight radial lines extending radially from the picture element of interest are set on the radiation image. As illustrated in FIG. 7, the directions of the eight radial lines, which are set in this step, are quantized into eight kinds of directions represented by 2 πj/8, wherein j represents an integral number of at least 0, with the proviso that j=0, 1, ..., 7. The eight kinds of the quantized directions of the radial lines coincide with the eight kinds of the quantized directions θ of the gradient vectors.

Thereafter, in a step 26 (#26), in the same manner as that in the step 5 of the aforesaid embodiment of the first iris filter operation method in accordance with the present invention, the address (x, y) of each of the picture elements, which are located along each of the radial lines, is calculated.

Figure 8:
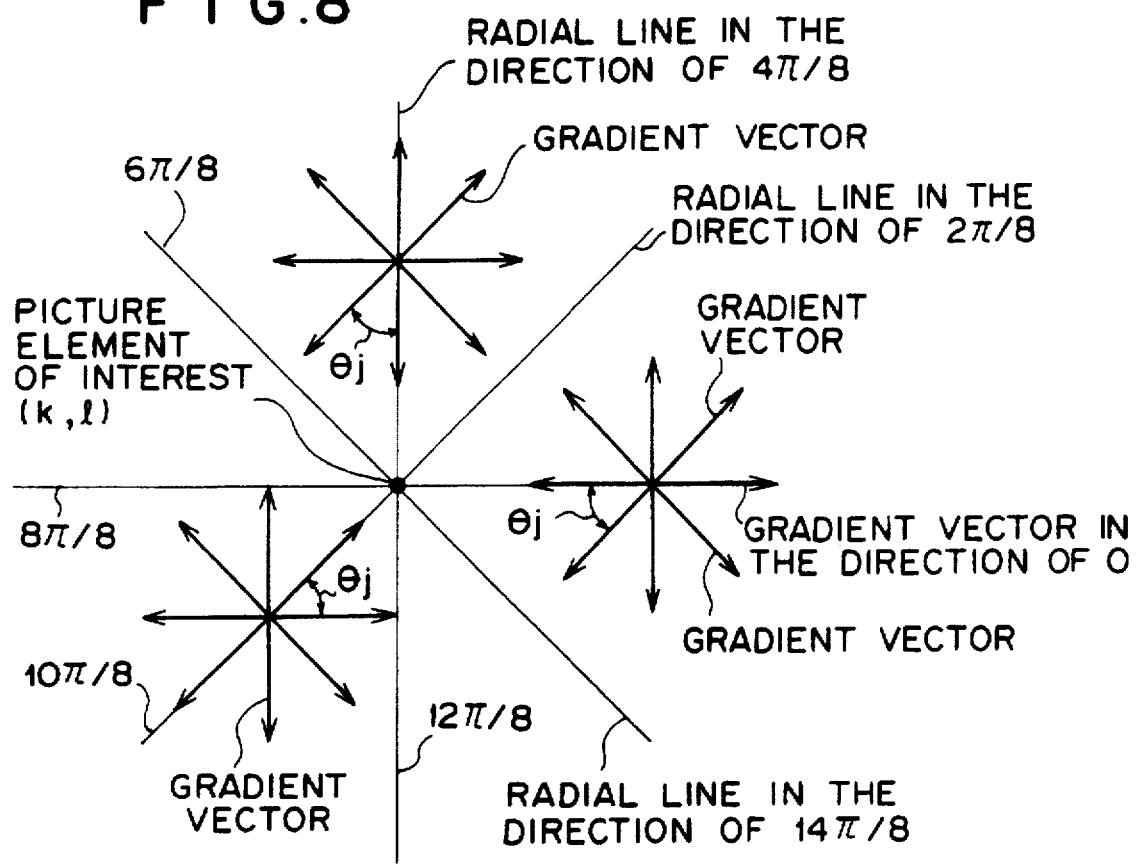
FIG. 8 is an explanatory view showing quantized angles θj, each of which is made between a gradient vector and each radial line.

In a step 27 (#27), for each of the picture elements, the addresses of which have been calculated in the step 26 (#26), the direction θ of the gradient vector, which has been stored in the step 23 (#23), is read from the storage means. Also, an angle θj between the gradient vector, which has been calculated for each picture element, and each radial line, is calculated. The angles θj, which are thus calculated, are determined by the quantized directions θ of the gradient vectors and the directions of the radial lines. Therefore, as illustrated in FIG. 8, the angles θj are also quantized. Specifically, as will be understood from FIG. 8, the angles θj take only eight values, i.e. 0, 2π/8, 4π/8, 6π/8, 8π/8, 10π/8, 12π/8, and 14π/8.

Therefore, the index value cos θj, which corresponds to each of the quantized angles θj and is to be used in the calculation of the degree of centralization with Formula (5) or (5') for each of the radial lines, can be calculated previously. Accordingly, in a step 20 (#20), a look-up table for converting the quantized angles θj into the index values cos θj is prepared previously and stored in a predetermined storage means. The look-up table is shown in Table 1 below.

TABLE 1

| θj | cos θj |
|---|---|
| 0 | 1 |
| 2π/8 | 0.7 (= ½^(1/2)) |
| 4π/8 | 0 |
| 6π/8 | −0.7 |
| 8π/8 | −1 |
| 10π/8 | −0.7 |
| 12π/8 | 0 |
| 14π/8 | 0.7 |

In a step 28 (#28), an index value cos θj representing the degree of centralization of the gradient vector, which has been calculated for each picture element among all of the picture elements located along each of the radial lines, upon the picture element of interest is found from the look-up table, which has been prepared in the step 20 (#20) in accordance with the angle θj between the gradient vector, which has been calculated for each picture element, and each radial line.

Also, in a step 29 (#29), a calculation is made to find a mean value Ci(n) of the index values cos θj having been calculated for all of the picture elements, which are located along each of the radial lines and fall within the range from the picture element of interest, that is located on the radial line, to a picture element, that is located at a length of distance falling within the range from a length of distance (an Rmin'th picture element) corresponding to the minimum size of the tumor pattern to be detected to a length of distance (an Rmax'th picture element) corresponding to the maximum size of the tumor pattern to be detected. The calculation is carried out with Formula (5). In this manner, a plurality of the mean values are obtained for each of the radial lines. In Formula (5), cos θil represents the rating value for the degree of centralization at the picture element, which is located on the i'th radial line shown in FIG. 4 and corresponds to l'th position, as counted from the picture element of interest, on the i'th radial line. Thus cos θil represents the index value cos θj at the l'th picture element on the i'th radial line. Also, Ci(n) represents the degree of centralization, which is obtained for the picture elements ranging from the picture element of interest to the n'th picture element on the i'th radial line.

In lieu of the processing with Formula (5), the processing with Formula (5') may be employed.

In a step 30 (#30), a maximum value Cimax of the values of Ci(n), which are obtained when the value of n is changed to values falling within the range from Rmin to Rmax, is calculated. By the calculation of the maximum value Cimax, the picture element, which is associated with the maximum degree of centralization, on the i'th radial line can be specified.

In the manner described above, the maximum value Cimax is obtained for each of the radial lines. Thereafter, in a step 31 (#31), in the same manner as that in the aforesaid embodiment of the first iris filter operation method in accordance with the present invention, the maximum values Cimax, which have been obtained for all of the plurality of the radial lines, are added and averaged. The degree of centralization C with respect to the picture element of interest having the address (k, l) is thus calculated.

In a step 32 (#32), the calculated degree of centralization C and a predetermined threshold value T are compared with each other. Thereafter, in a step 33 (#33), in cases where C>T, it is judged that the picture element of interest corresponds to the center portion of a tumor pattern. In cases where C≦T, it is judged that the picture element of interest does not correspond to the center portion of a tumor pattern.

In a step 34 (#34), a next picture element of interest is set. Thus the picture element of interest is changed successively over all of the picture elements constituting the radiation image, and the processing from #25 to #33 is repeated for the respective picture elements of interest.

In the manner described above, with this embodiment of the first iris filter operation method in accordance with the present invention, the index values cos θj representing the degrees of centralization take only a limited number of values. Therefore, the look-up table, in which the values of the index values cos θj and the corresponding angles θj are listed, can be prepared previously. Accordingly, the processing of the trigonometric function of Formula (5) or (5'), which takes a comparatively long time, need not be carried out, and the processing with the iris filter can be carried out quickly.

An embodiment of the third iris filter operation method in accordance with the present invention will be described hereinbelow.

Figure 9:
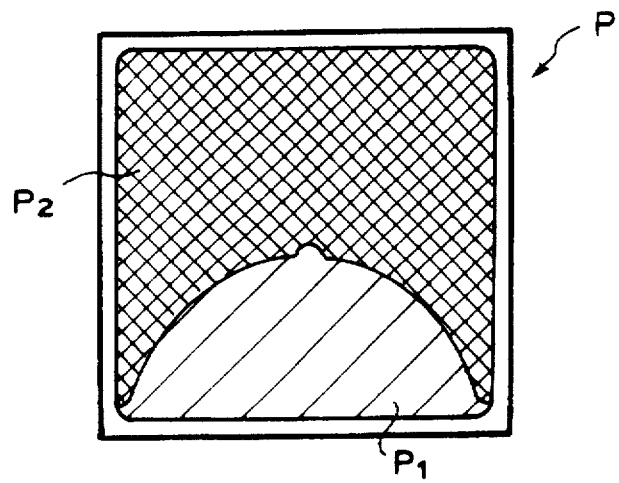
FIG. 9 is a schematic view showing an X-ray image P, in which a mamma image $P_1$ is recorded, the mamma image $P_1$ being subjected to the operation in an embodiment of the third iris filter operation method in accordance with the present invention.
Figure 10:
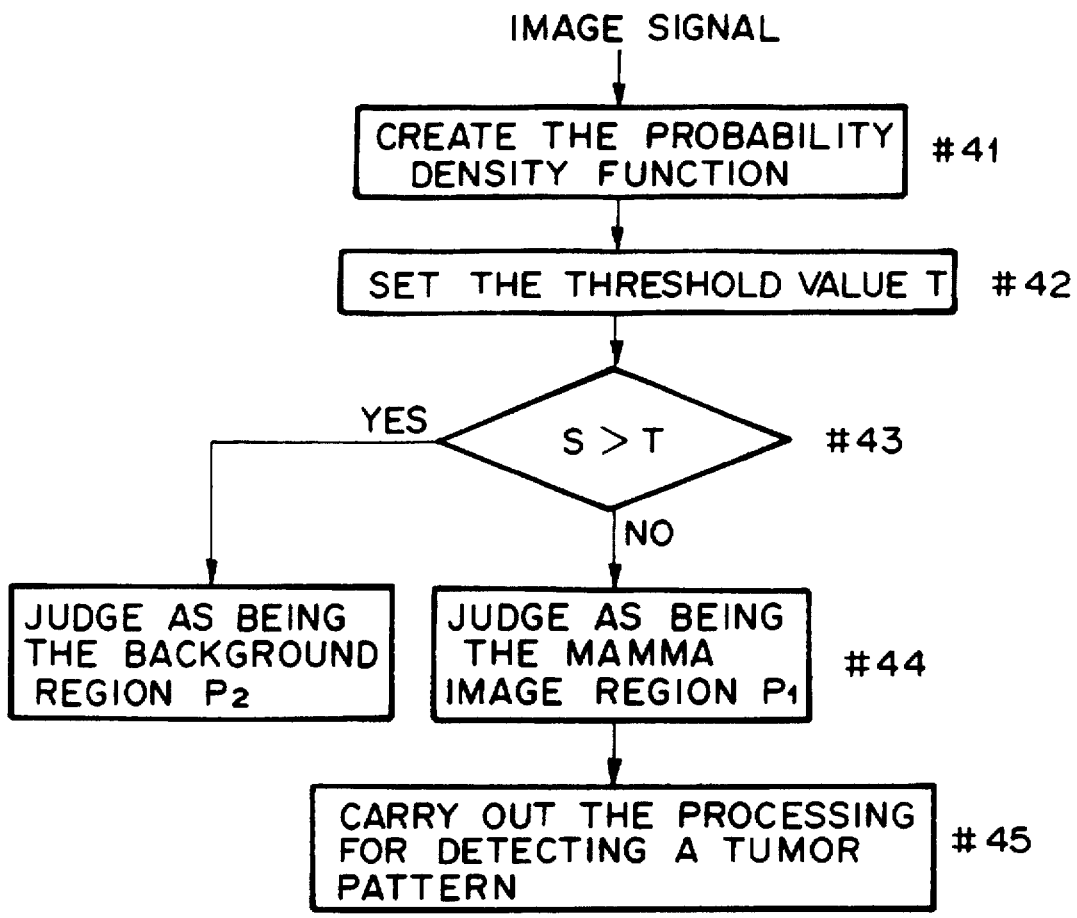
FIG. 10 is a flow steps showing processing steps in an embodiment of the third iris filter operation method in accordance with the present invention.
Figure 11:
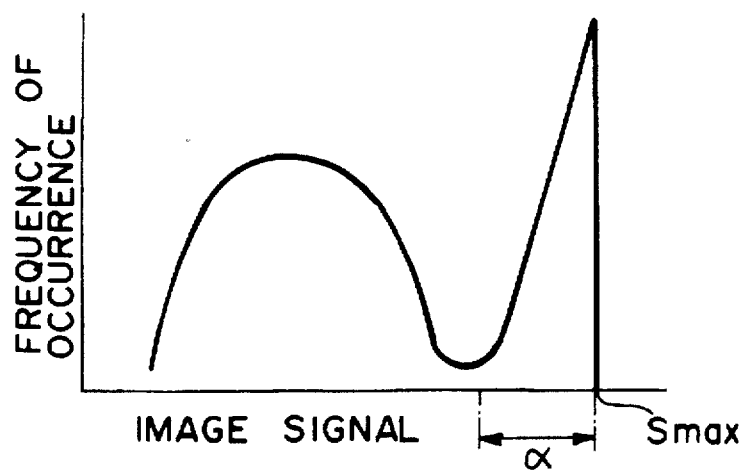
FIG. 11 is a graph showing a probability density function of an image signal representing the X-ray image P.

FIG. 9 is a schematic view showing an X-ray image P, in which a mamma image $P_1$ is recorded, the mamma image $P_1$ being subjected to the operation in the embodiment of the third iris filter operation method in accordance with the present invention. FIG. 10 is a flow chart showing processing steps in the embodiment of the third iris filter operation method in accordance with the present invention. FIG. 11 is a graph showing a probability density function of the image signal representing the X-ray image P. In the X-ray image P shown in FIG. 9, the region other than the region, in which the mamma image $P_1$ is recorded, is a background region $P_2$, upon which the X-rays impinged directly in the operation for recording the X-ray image P. In the background region $P_2$, a tumor pattern to be subjected to the operation of the iris filter is not located.

Therefore, in this embodiment of the third iris filter operation method in accordance with the present invention, as illustrated in FIG. 10, in a step 41 (#41), from the image signal representing the X-ray image P, a probability density function representing the frequency of occurrence of the image signal is created. The patterns of such probability density functions can be classified into several kinds of patterns, which are set experimentally in accordance with the kind of the object, the orientation in which the object was placed when the image of the object was recorded, and the like. Therefore, as for the mamma image $P_1$ to be subjected to this embodiment of the iris filter operation method, the pattern of the probability density function of the image signal representing the mamma image $P_1$ can be known previously. It can also be known that, as illustrated in FIG. 11, in the pattern of the probability density function, the portion ranging from the maximum value Smax of the image signal values to the value smaller by a signal value α than the maximum value Smax corresponds to the background region $P_2$.

Accordingly, in a step 42 (#42), a calculation is made to find the maximum value Smax of the image signal values in the probability density function, which has been created in the step 41. Also, the value obtained by subtracting the predetermined value α from the maximum value Smax is set as a threshold value T.

Thereafter, in a step 43 (#43), the values of all image signal components S of the given image signal and the threshold value T are compared with each other. In a step 44 (#44), in cases where S>T, it is judged that the image signal components S correspond to the background region $P_2$. In such cases, the subsequent processing is not carried out on the image signal components S. In a step 44 (#44), in cases where S≦T, it is judged that the image signal components S correspond to the region of the mamma image $P_1$. In such cases, in a step 45 (#45), the operation processing of the iris filter, i.e. the processing for detecting a tumor pattern, described for one of the aforesaid embodiments is carried out on only the image signal components S judged as corresponding to the region of the mamma image $P_1$. The operation processing of the iris filter in the step 45 and those that follow is the same as that in one of the aforesaid embodiments.

With this embodiment of the third iris filter operation method in accordance with the present invention, the operation of the iris filter is carried out only for the picture elements, which are located in the object image region in the radiation image. Specifically, as for the region, in which no object image can be present and therefore no tumor pattern can be present, the detection processing with the iris filter operation method is not carried out. Therefore, the operation of the iris filter can be omitted for the region, in which no object image can be present. Accordingly, as a whole, the operation of the iris filter can be carried out quickly.

In the embodiment of the third iris filter operation method in accordance with the present invention, the number of the image signal components, which are subjected to the operation processing of the iris filter, is reduced by limiting the range of the processing to the image signal components corresponding to the object image region. In this manner, as a whole, the operation processing is carried out quickly. Alternatively, the image signal, which is subjected to the operation of the iris filter, may be obtained by resampling the image signal components from an original image signal at a resampling density falling within the range of ⅛ to ½ along each of the row and column directions in the array of picture elements. The resampling density should preferably fall within the range of ⅛ to ¼ along each of the row and column directions in the array of picture elements. In such cases, the number of the image signal components, which are subjected to the operation of the iris filter, becomes equal to a number falling within the range of 1/64 to ¼ of the number of the image signal components of the original image signal. The number of the image signal components should preferably be reduced to a number falling within the range of 1/64 to ⅙ of the number of the image signal components of the original image signal. In this manner, the operation of the iris filter can be carried out quickly with respect to the entire area of the radiation image.

Ordinarily, the size of a tumor pattern in an image is at least approximately 5 mm and at most approximately several centimeters. Also, the size of a single picture element obtained by sampling the image signal is approximately 100 μ. Therefore, even if the number of the image signal components, which are subjected to the operation of the iris filter, is reduced in the manner described above, a tumor pattern can be detected accurately.

Each of the embodiments described above is applicable to the aforesaid apparatuses for computer aided diagnosis of medical images.

What is claimed is:

1. An iris filter operation method, in which an image signal representing a radiation image of an object is obtained, the image signal being made up of a series of image signal components representing picture elements of the radiation image, and a tumor pattern is detected from the radiation image in accordance with the image signal, the method comprising the steps of:

1 for each picture element among all of the picture elements of the radiation image, calculating a gradient vector of the image signal, 2 setting a picture element of interest having an arbitrary address, said picture element of interest being among all of the picture elements of the radiation image, 3 setting a plurality of radial lines on the radiation image, said radial lines extending radially from said picture element of interest and being adjacent to one another at predetermined angle intervals, 4 calculating the address of each of the picture elements, which are located along each of said radial lines, 5 calculating an index value cos θj representing the degree of centralization of the gradient vector, which has been calculated for each picture element among all of the picture elements located along each of said radial lines and having the addresses calculated, upon said picture element of interest, said index value cos θj being calculated from an angle θj between said gradient vector, which has been calculated for said each picture element, and said each radial line, 6 calculating a mean value of the index values cos θj having been calculated for all of the picture elements, which are located along each of said radial lines and fall within the range from said picture element of interest, that is located on said each radial line, to a picture element, that is located at a length of distance falling within the range from a length of distance corresponding to the minimum size of the tumor pattern to be detected to a length of distance corresponding to the maximum size of the tumor pattern to be detected, a plurality of the mean values being thereby obtained for each of said radial lines, 7 finding the maximum value of said mean values, which have been obtained for each of said radial lines, calculating a total sum of the maximum values, which have been obtained for all of the plurality of said radial lines, and calculating a value of the degree of centralization of the gradient vector group with respect to said picture element of interest from said total sum, 8 comparing the value of said degree of centralization of the gradient vector group and a predetermined threshold value with each other, 9 in cases where the value of said degree of centralization of the gradient vector group is not smaller than a predetermined threshold value, judging that a range having its center at said picture element of interest and extending from said picture element of interest to the picture elements, which are associated with said maximum values of said mean values having been obtained for all of the plurality of said radial lines, is the tumor pattern, and 10 successively setting an address of a picture element of interest over all of the picture elements of the radiation image, repeating the processing of 3 to 9, the tumor pattern being thereby detected from the radiation image, wherein the improvement comprises the steps of:

a) in an n'th processing from 3 to 9, wherein n=1, 2, . . . , storing the information representing the address of each of the picture elements, which are located along each of said radial lines, in an address storing means, the address having been calculated in the processing of 4, b) calculating a relative address of each of the picture elements of interest, which are set for an n+1'th processing and those that follow in the processing of 10, with respect to the picture element of interest, which has been set in said n'th processing, and c) carrying out the address calculation of 4 in each of said n+1'th processing and those that follow by adding said calculated relative address to the address of each of the picture elements, which address has been stored in said address storing means.

2. A method as defined in claim 1 wherein the value of n is 1.

3. A method as defined in claim 1 wherein the radiation image has been stored on a stimulable phosphor sheet.

4. A method as defined in claim 1 wherein the radiation image has been recorded on photographic film.

5. An iris filter operation method, in which an image signal representing a radiation image of an object is obtained, the image signal being made up of a series of image signal components representing picture elements of the radiation image, and a tumor pattern is detected from the radiation image in accordance with the image signal, the method comprising the steps of:

1 for each picture element among all of the picture elements of the radiation image, calculating a gradient vector of the image signal, 2 setting a picture element of interest having an arbitrary address, said picture element of interest being among all of the picture elements of the radiation image, 3 setting a plurality of radial lines on the radiation image, said radial lines extending radially from said picture element of interest and being adjacent to one another at predetermined angle intervals, 4 calculating the address of each of the picture elements, which are located along each of said radial lines, 5 calculating an index value $\cos \theta j$ representing the degree of centralization of the gradient vector, which has been calculated for each picture element among all of the picture elements located along each of said radial lines and having the addresses calculated, upon said picture element of interest, said index value $\cos \theta j$ being calculated from an angle $\theta j$ between said gradient vector, which has been calculated for said each picture element, and said each radial line, 6 calculating a mean value of the index values $\cos \theta j$ having been calculated for all of the picture elements, which are located along each of said radial lines and fall within the range from a picture element, that is located at a length of distance corresponding to the minimum size of the tumor pattern to be detected, the length of distance being taken from said picture element of interest located on said each radial line, to a picture element, that is located at a length of distance falling within the range from the length of distance corresponding to the minimum size of the tumor pattern to be detected to a length of distance corresponding to the maximum size of the tumor pattern to be detected, the length of distance being taken from said picture element of interest located on said each radial line, a plurality of the mean values being thereby obtained for each of said radial lines, 7 finding the maximum value of said mean values, which have been obtained for each of said radial lines, calculating a total sum of the maximum values, which have been obtained for all of the plurality of said radial lines, and calculating a value of the degree of centralization of the gradient vector group with respect to said picture element of interest from said total sum, 8 comparing the value of said degree of centralization of the gradient vector group and a predetermined threshold value with each other, 9 in cases where the value of said degree of centralization of the gradient vector group is not smaller than a predetermined threshold value, judging that a range having its center at said picture element of interest and extending from said picture element of interest to the picture elements, which are associated with said maximum values of said mean values having been obtained for all of the plurality of said radial lines, is the tumor pattern, and 10 successively setting an address of a picture element of interest over all of the picture elements of the radiation image, repeating the processing of 3 to 9, the tumor pattern being thereby detected from the radiation image, wherein the improvement comprises the steps of:

a) in an n'th processing from 3 to 9, wherein n=1, 2, . . . , storing the information representing the address of each of the picture elements, which are located along each of said radial lines, in an address storing means, the address having been calculated in the processing of 4, b) calculating a relative address of each of the picture elements of interest, which are set for an n+1'th processing and those that follow in the processing of 10, with respect to the picture element of interest, which has been set in said n'th processing, and c) carrying out the address calculation of 4 in each of said n+1'th processing and those that follow by adding said calculated relative address to the address of each of the picture elements, which address has been stored in said address storing means.

6. A method as defined in claim 5 wherein the value of n is 1.

7. A method as defined in claim 5 wherein the radiation image has been stored on a stimulable phosphor sheet.

8. A method as defined in claim 5 wherein the radiation image has been recorded on photographic film.

9. An iris filter operation method, in which an image signal representing a radiation image of an object is obtained, the image signal being made up of a series of image signal components representing picture elements of the radiation image, and a tumor pattern is detected from the radiation image in accordance with the image signal, the method comprising the steps of:

1 for each picture element among all of the picture elements of the radiation image, calculating a gradient vector of the image signal, 2 setting a picture element of interest having an arbitrary address, said picture element of interest being among all of the picture elements of the radiation image, 3 setting a plurality of radial lines on the radiation image, said radial lines extending radially from said picture element of interest and being adjacent to one another at predetermined angle intervals, 4 calculating the address of each of the picture elements, which are located along each of said radial lines, 5 calculating an index value $\cos \theta j$ representing the degree of centralization of the gradient vector, which has been calculated for each picture element among all of the picture elements located along each of said radial lines and having the addresses calculated, upon said picture element of interest, said index value $\cos \theta j$ being calculated from an angle $\theta j$ between said gradient vector, which has been calculated for said each picture element, and said each radial line, 6 calculating a mean value of the index values $\cos \theta j$ having been calculated for all of the picture elements, which are located along each of said radial lines and fall within the range from said picture element of interest, that is located on said each radial line, to a picture element, that is located at a length of distance falling within the range from a length of distance corresponding to the minimum size of the tumor pattern to be detected to a length of distance corresponding to the maximum size of the tumor pattern to be detected, a plurality of the mean values being thereby obtained for each of said radial lines, 7 finding the maximum value of said mean values, which have been obtained for each of said radial lines, calculating a total sum of the maximum values, which have been obtained for all of the plurality of said radial lines, and calculating a value of the degree of centralization of the gradient vector group with respect to said picture element of interest from said total sum, 8 comparing the value of said degree of centralization of the gradient vector group and a predetermined threshold value with each other, 9 in cases where the value of said degree of centralization of the gradient vector group is not smaller than a predetermined threshold value, judging that a range having its center at said picture element of interest and extending from said picture element of interest to the picture elements, which are associated with said maximum values of said mean values having been obtained for all of the plurality of said radial lines, is the tumor pattern, and 10 successively setting an address of a picture element of interest over all of the picture elements of the radiation image, repeating the processing of 3 to 9, the tumor pattern being thereby detected from the radiation image, wherein the improvement comprises the steps of:

a) quantizing the directions of the gradient vectors, which have been calculated in the processing of 1, into predetermined M kinds of directions represented by $2\pi m/M$, wherein M represents an integral number of at least 3, and m represents an integral number of at least 0, with the proviso that $m=0, 1, \ldots, M-1$, b) quantizing the directions of the plurality of said radial lines in the processing of 3 into N kinds of directions represented by $2\pi j/N$, wherein N represents an integral number of at least 3, and j represents an integral number of at least 0, with the proviso that $j=0, 1, \ldots, N-1$, c) thereby quantizing the angles $\theta j$, each of which is made between said gradient vector, that has been calculated for said each picture element, and said each radial line in the processing of 5, d) calculating the index value $\cos \theta j$ corresponding to each of said quantized angles $\theta j$, a look-up table for converting the quantized angles $\theta j$ into the index values $\cos \theta j$ being thereby prepared, and e) carrying out the calculation of said index value $\cos \theta j$ in the processing of 5 by obtaining said index value $\cos \theta j$ for each of said quantized angles $\theta j$ from said look-up table.

10. A method as defined in claim 9 wherein the value of M is set to be equal to the value of N, and the quantized directions $\theta$, which the gradient vectors take, and the quantized directions of the plurality of said radial lines are set such that they may coincide with each other.

11. A method as defined in claim 9 wherein the value of N is set to be integral multiples of the value of M.

12. A method as defined in claim 9 wherein the value of M is set to be integral multiples of the value of N.

13. A method as defined in claim 9 wherein the radiation image has been stored on a stimulable phosphor sheet.

14. A method as defined in claim 9 wherein the radiation image has been recorded on photographic film.

15. An iris filter operation method, in which an image signal representing a radiation image of an object is obtained, the image signal being made up of a series of image signal components representing picture elements of the radiation image, and a tumor pattern is detected from the radiation image in accordance with the image signal, the method comprising the steps of:

1 for each picture element among all of the picture elements of the radiation image, calculating a gradient vector of the image signal, 2 setting a picture element of interest having an arbitrary address, said picture element of interest being among all of the picture elements of the radiation image, 3 setting a plurality of radial lines on the radiation image, said radial lines extending radially from said picture element of interest and being adjacent to one another at predetermined angle intervals, 4 calculating the address of each of the picture elements, which are located along each of said radial lines, 5 calculating an index value $\cos \theta j$ representing the degree of centralization of the gradient vector, which has been calculated for each picture element among all of the picture elements located along each of said radial lines and having the addresses calculated, upon said picture element of interest, said index value $\cos \theta j$ being calculated from an angle $\theta j$ between said gradient vector, which has been calculated for said each picture element, and said each radial line, 6 calculating a mean value of the index values $\cos \theta j$ having been calculated for all of the picture elements, which are located along each of said radial lines and fall within the range from a picture element, that is located at a length of distance corresponding to the minimum size of the tumor pattern to be detected, the length of distance being taken from said picture element of interest located on said each radial line, to a picture element, that is located at a length of distance falling within the range from the length of distance corresponding to the minimum size of the tumor pattern to be detected to a length of distance corresponding to the maximum size of the tumor pattern to be detected, the length of distance being taken from said picture element of interest located on said each radial line, a plurality of the mean values being thereby obtained for each of said radial lines, 7 finding the maximum value of said mean values, which have been obtained for each of said radial lines, calculating a total sum of the maximum values, which have been obtained for all of the plurality of said radial lines, and calculating a value of the degree of centralization of the gradient vector group with respect to said picture element of interest from said total sum, 8 comparing the value of said degree of centralization of the gradient vector group and a predetermined threshold value with each other, 9 in cases where the value of said degree of centralization of the gradient vector group is not smaller than a predetermined threshold value, judging that a range having its center at said picture element of interest and extending from said picture element of interest to the picture elements, which are associated with said maximum values of said mean values having been obtained for all of the plurality of said radial lines, is the tumor pattern, and 10 successively setting an address of a picture element of interest over all of the picture elements of the radiation image, repeating the processing of 3 to 9, the tumor pattern being thereby detected from the radiation image, wherein the improvement comprises the steps of:

a) quantizing the directions of the gradient vectors, which have been calculated in the processing of 1, into predetermined M kinds of directions represented by $2\pi m/M$, wherein M represents an integral number of at least 3, and m represents an integral number of at least 0, with the proviso that m=0, 1, ..., M−1, b) quantizing the directions of the plurality of said radial lines in the processing of 3 into N kinds of directions represented by $2\pi j/N$, wherein N represents an integral number of at least 3, and j represents an integral number of at least 0, with the proviso that j=0, 1, ..., N−1, c) thereby quantizing the angles $\theta j$, each of which is made between said gradient vector, that has been calculated for said each picture element, and said each radial line in the processing of 5, d) calculating the index value $\cos \theta j$ corresponding to each of said quantized angles $\theta j$, a look-up table for converting the quantized angles $\theta j$ into the index values $\cos \theta j$ being thereby prepared, and e) carrying out the calculation of said index value $\cos \theta j$ in the processing of 5 by obtaining said index value $\cos \theta j$ for each of said quantized angles $\theta j$ from said look-up table.

16. A method as defined in claim 15 wherein the value of M is set to be equal to the value of N, and the quantized directions $\theta$, which the gradient vectors take, and the quantized directions of the plurality of said radial lines are set such that they may coincide with each other.

17. A method as defined in claim 15 wherein the value of N is set to be integral multiples of the value of M.

18. A method as defined in claim 15 wherein the value of M is set to be integral multiples of the value of N.

19. A method as defined in claim 15 wherein the radiation image has been stored on a stimulable phosphor sheet.

20. A method as defined in claim 15 wherein the radiation image has been recorded on photographic film.

21. An iris filter operation method, in which an image signal representing a radiation image of an object is obtained, the image signal being made up of a series of image signal components representing picture elements of the radiation image, and a tumor pattern is detected from the radiation image in accordance with the image signal, the method comprising the steps of:

1 for each picture element among all of the picture elements of the radiation image, calculating a gradient vector of the image signal, 2 setting a picture element of interest having an arbitrary address, said picture element of interest being among all of the picture elements of the radiation image, 3 setting a plurality of radial lines on the radiation image, said radial lines extending radially from said picture element of interest and being adjacent to one another at predetermined angle intervals, 4 calculating the address of each of the picture elements, which are located along each of said radial lines, 5 calculating an index value $\cos \theta j$ representing the degree of centralization of the gradient vector, which has been calculated for each picture element among all of the picture elements located along each of said radial lines and having the addresses calculated, upon said picture element of interest, said index value $\cos \theta j$ being calculated from an angle $\theta j$ between said gradient vector, which has been calculated for said each picture element, and said each radial line, 6 calculating a mean value of the index values $\cos \theta j$ having been calculated for all of the picture elements, which are located along each of said radial lines and fall within the range from said picture element of interest, that is located on said each radial line, to a picture element, that is located at a length of distance falling within the range from a length of distance corresponding to the minimum size of the tumor pattern to be detected to a length of distance corresponding to the maximum size of the tumor pattern to be detected, a plurality of the mean values being thereby obtained for each of said radial lines, 7 finding the maximum value of said mean values, which have been obtained for each of said radial lines, calculating a total sum of the maximum values, which have been obtained for all of the plurality of said radial lines, and calculating a value of the degree of centralization of the gradient vector group with respect to said picture element of interest from said total sum, 8 comparing the value of said degree of centralization of the gradient vector group and a predetermined threshold value with each other, 9 in cases where the value of said degree of centralization of the gradient vector group is not smaller than a predetermined threshold value, judging that a range having its center at said picture element of interest and extending from said picture element of interest to the picture elements, which are associated with said maximum values of said mean values having been obtained for all of the plurality of said radial lines, is the tumor pattern, and 10 successively setting an address of a picture element of interest over all of the picture elements of the radiation image, repeating the processing of 3 to 9, the tumor pattern being thereby detected from the radiation image, wherein the improvement comprises obtaining said image signal by resampling the image signal components from an original image signal at a resampling density falling within the range of ⅛ to ½ along each of the row and column directions in the array of picture elements.

22. A method as defined in claim 21 wherein said resampling density falls within the range of ⅛ to ¼ along each of the row and column directions in the array of picture elements.

23. A method as defined in claim 21 wherein the radiation image has been stored on a stimulable phosphor sheet.

24. A method as defined in claim 21 wherein the radiation image has been recorded on photographic film.

25. An iris filter operation method, in which an image signal representing a radiation image of an object is obtained, the image signal being made up of a series of image signal components representing picture elements of the radiation image, and a tumor pattern is detected from the radiation image in accordance with the image signal, the method comprising the steps of:

1 for each picture element among all of the picture elements of the radiation image, calculating a gradient vector of the image signal, 2 setting a picture element of interest having an arbitrary address, said picture element of interest being among all of the picture elements of the radiation image, 3 setting a plurality of radial lines on the radiation image, said radial lines extending radially from said picture element of interest and being adjacent to one another at predetermined angle intervals, 4 calculating the address of each of the picture elements, which are located along each of said radial lines, 5 calculating an index value cos θj representing the degree of centralization of the gradient vector, which has been calculated for each picture element among all of the picture elements located along each of said radial lines and having the addresses calculated, upon said picture element of interest, said index value cos θj being calculated from an angle θj between said gradient vector, which has been calculated for said each picture element, and said each radial line, 6 calculating a mean value of the index values cos θj having been calculated for all of the picture elements, which are located along each of said radial lines and fall within the range from a picture element, that is located at a length of distance corresponding to the minimum size of the tumor pattern to be detected, the length of distance being taken from said picture element of interest located on said each radial line, to a picture element, that is located at a length of distance falling within the range from the length of distance corresponding to the minimum size of the tumor pattern to be detected to a length of distance corresponding to the maximum size of the tumor pattern to be detected, the length of distance being taken from said picture element of interest located on said each radial line, a plurality of the mean values being thereby obtained for each of said radial lines, 7 finding the maximum value of said mean values, which have been obtained for each of said radial lines, calculating a total sum of the maximum values, which have been obtained for all of the plurality of said radial lines, and calculating a value of the degree of centralization of the gradient vector group with respect to said picture element of interest from said total sum, 8 comparing the value of said degree of centralization of the gradient vector group and a predetermined threshold value with each other, 9 in cases where the value of said degree of centralization of the gradient vector group is not smaller than a predetermined threshold value, judging that a range having its center at said picture element of interest and extending from said picture element of interest to the picture elements, which are associated with said maximum values of said mean values having been obtained for all of the plurality of said radial lines, is the tumor pattern, and 10 successively setting an address of a picture element of interest over all of the picture elements of the radiation image, repeating the processing of 3 to 9, the tumor pattern being thereby detected from the radiation image, wherein the improvement comprises obtaining said image signal by resampling the image signal components from an original image signal at a resampling density falling within the range of ⅛ to ½ along each of the row and column directions in the array of picture elements.

26. A method as defined in claim 25 wherein said resampling density falls within the range of ⅛ to ¼ along each of the row and column directions in the array of picture elements.

27. A method as defined in claim 25 wherein the radiation image has been stored on a stimulable phosphor sheet.

28. A method as defined in claim 25 wherein the radiation image has been recorded on photographic film.

* * * * *